US011894646B2

(12) United States Patent
Zhu

(10) Patent No.: US 11,894,646 B2
(45) Date of Patent: Feb. 6, 2024

(54) PIERCING ELECTRICAL CONNECTOR

(71) Applicant: HONG RU CONNECTORS CO. LTD, Guangdong (CN)

(72) Inventor: Feng Zhu, Guangdong (CN)

(73) Assignee: HONG RU CONNECTORS CO. LTD, Guangdong (CN)

( * ) Notice: Subject to any disclaimer, the term of this patent is extended or adjusted under 35 U.S.C. 154(b) by 270 days.

(21) Appl. No.: 17/614,567

(22) PCT Filed: May 29, 2020

(86) PCT No.: PCT/CN2020/093444
§ 371 (c)(1),
(2) Date: Nov. 29, 2021

(87) PCT Pub. No.: WO2020/239100
PCT Pub. Date: Dec. 3, 2020

(65) Prior Publication Data

US 2022/0231432 A1 Jul. 21, 2022

(30) Foreign Application Priority Data

May 29, 2019 (CN) ......................... 201910455937.0

(51) Int. Cl.
*H01R 4/2406* (2018.01)
*H01R 13/506* (2006.01)
(Continued)

(52) U.S. Cl.
CPC ........... *H01R 4/2406* (2018.01); *H01R 12/67* (2013.01); *H01R 13/506* (2013.01); *H01R 13/6272* (2013.01)

(58) Field of Classification Search
None
See application file for complete search history.

(56) References Cited

U.S. PATENT DOCUMENTS 4,359,257 A * 11/1982 Lopinski .............. H01R 12/675 439/405
5,562,478 A 10/1996 Yamamoto
(Continued)

FOREIGN PATENT DOCUMENTS

| | | |
|---|---|---|
| CN | 104969419 | 10/2015 |
| CN | 107645091 | 1/2018 |
| CN | 110165428 | 8/2019 |

OTHER PUBLICATIONS

"International Search Report (Form PCT/ISA/210) of PCT/CN2020/093444," dated Sep. 1, 2020, with English translation thereof, pp. 1-4.

(Continued)

*Primary Examiner* — Oscar C Jimenez
(74) *Attorney, Agent, or Firm* — JCIP GLOBAL INC.

(57) ABSTRACT

A piercing electrical connector includes a wire end connector. The wire end connector has a wire end body, a wire end terminal, and a wire cover engaged with the wire end body. The wire cover has a wire holding hole, and the wire end terminal has a piercing portion. The wire cover further has a clasping plate, a clasping arm and a first clasping head. The wire end body has a clasping groove, a clasping hole, a protrusion located in the clasping groove, a pre-locking groove and a locking groove that communicate with the clasping hole. When the wire end connector needs to be transported, the first clasping head extends into the pre-locking groove, and the protrusion abuts against a free end of the clasping plate so that the wire cover and the wire end body are pre-assembled together, and the piercing portion does not pierce a cable wire.

10 Claims, 9 Drawing Sheets

(51) Int. Cl.
*H01R 13/627* (2006.01)
*H01R 12/67* (2011.01)

(56) References Cited

U.S. PATENT DOCUMENTS

| | | | | | |
|---|---|---|---|---|---|
| 5,980,303 | A * | 11/1999 | Lee | H01R 12/675 439/405 |
| 6,036,531 | A * | 3/2000 | Lee | H01R 12/675 439/459 |
| 6,896,540 | B1 * | 5/2005 | Wu | H01R 4/2433 439/417 |
| 9,437,953 | B2 * | 9/2016 | Lappoehn | H01R 13/6272 |
| 2004/0185703 | A1 * | 9/2004 | Lee | H01R 4/2454 439/417 |

OTHER PUBLICATIONS

"Written Opinion of the International Searching Authority (Form PCT/ISA/237) of PCT/CN2020/093444," dated Sep. 1, 2020, pp. 1-5.

* cited by examiner

PIERCING ELECTRICAL CONNECTOR

CROSS-REFERENCE TO RELATED APPLICATION

This is a 371 application of the International PCT application serial no. PCT/CN2020/093444, filed on May 29, 2020 which claims the priority benefits of China Application No. 201910455937.0 filed on May 29, 2019. The entirety of each of the above-mentioned patent applications is hereby incorporated by reference herein and made a part of this specification.

TECHNICAL FIELD

The disclosure relates to an electrical connector technology field. In particular, the disclosure discloses a piercing electrical connector.

DESCRIPTION OF RELATED ART

To facilitate ease of electrical connection of cable wires, in a connector of the existing art, a piercing terminal is used to pierce a cable wire, so as to accomplish the technique of rapid electrical connection. Nevertheless, structural design of the connectors of the existing art is not reasonable. In the existing art, a connector is required to be packaged in a tray, so that a cover shell and a plastic shell are prevented from being tightly assembled owing to collisions among connectors, which may cause the connectors from being plugged into cable wires normally. As such, packaging costs of the connectors are raised significantly.

Moreover, when an existing connector is connected to a cable wire, a crimped external wire is required to be manually assembled into the plastic shell body. Such approach may lead several disadvantages. For example, mistakes may be made easily by manual assembly, which may lead to electrical accidents.

SUMMARY

In order to overcome the disadvantages and shortcomings in the existing art, the disclosure is aimed to provide a piercing electrical connector to prevent a wire cover and a wire end body from being tightly assembled or from being separated, so that wire harness manufacturers may encounter less trouble during transportation. Moreover, the connectors may be packaged conveniently and the cable wires may be electrically connected easily, so that assembly costs are lowered and production efficiency is improved.

To accomplish the foregoing aim, the disclosure provides a piercing electrical connector. The piercing electrical connector includes a wire end connector, and the wire end connector has a wire end body, a wire end terminal disposed on the wire end body, and a wire cover engaged and matched with the wire end body. The wire cover has a wire accommodation hole configured to accommodate an external cable wire, the wire end terminal has a piercing portion, and the piercing portion is configured to pierce an insulating layer of the cable wire of the wire cover such that the wire end terminal is electrically connected to the cable wire. The wire cover has a clasping plate, a clasping arm, and a first clasping head protruding from and formed on the clasping arm, and an engaging hole is disposed on the clasping plate. The wire end body has a clasping groove, a clasping hole, a protrusion located in the clasping groove, a pre-locking groove and a locking groove communicating the clasping hole. The pre-locking groove and the locking groove are disposed in a misaligned manner in a length direction of the clasping hole. The clasping groove and the clasping hole are disposed on different side walls of the wire end body. The clasping groove is configured to accommodate the clasping plate, and the clasping hole is configured to accommodate the clasping arm. The first clasping head protrudes into the pre-locking groove, the protrusion is in contact with a free end of the clasping plate, such that the wire cover and the wire end body are pre-assembled together, and the piercing portion does not pierce the cable wire. The first clasping head protrudes into the locking groove, and the protrusion protrudes into the engaging hole, so that the wire cover and the wire end body are assembled together, and the piercing portion pierces the insulating layer of the cable wire so that the wire end terminal is electrically connected to the cable wire.

Preferably, the clasping arm has a second clasping head, and the first clasping head and the second clasping head are disposed in a length direction of the clasping arm in a misaligned manner. The first clasping head protrudes into the pre-locking groove, the protrusion is in contact with the free end of the clasping plate, and the second clasping head protrudes into the locking groove, so that the wire cover and the wire end body are pre-assembled together, and the piercing portion does not pierce the cable wire the first clasping head protrudes into the locking groove, the protrusion protrudes into the engaging hole, and the second clasping head moves out of the engaging hole and is in contact with an external surface of the wire end body, such that the wire cover and the wire end body are assembled together, and the piercing portion pierces the insulating layer of the cable wire so that the wire end terminal is electrically connected to the cable wire.

Preferably, guide plates are respectively disposed on two sides of clasping arms away from each other. The wire end body has a guide hole communicating the clasping hole. A width of the guide hole is greater than a width of the clasping hole, and both the guide plates respectively at the two sides of the clasping arms protrude into the guide hole.

Preferably, the wire end terminal further has a wire end contacting portion connected to the piercing portion. The piercing portion has an end disposed away from the wire end contacting portion and protruding out of the wire end body. The wire cover has a first receding hole communicating the wire accommodation hole, and the first receding hole and the wire accommodation hole are disposed in a misaligned manner. The piercing portion pierces the insulating layer of the cable wire in the wire accommodation hole through the first receding hole.

Preferably, the wire end body has a second receding hole exposing the piercing portion and being close to the wire end contacting portion. The wire cover has a supporting pillar protruding into the second receding hole. The supporting pillar is configured to be in contact with the wire end terminal to prevent deformation of the wire end terminal.

Preferably, the wire end terminal further has a wire end fixing portion. The wire end contacting portion and the piercing portion respectively extend from two ends of the wire end fixing portion away from each other. The wire end fixing portion has an advancing stop position and a stopping hook. The wire end body has advancing stop stairs configured to block the advancing stop position to prevent the wire end fixing portion from being excessively inserted into the wire end body. The stopping hook protrudes into the wire end body to prevent the wire end terminal from being removed from the wire end body. A number of the piercing portion is two, and the two piercing portions are configured to clamp the cable wire in the wire accommodation hole. Sides of the two piercing portions close to each other are configured to pierce the insulating layer of the cable wire in the wire accommodation hole.

Preferably, a number of the wire end terminal is plural. The wire end body has a plugging blind groove. A corner of the plugging blind groove has a foolproof portion. The wire end contacting portion penetrates through a bottom wall of the plugging blind groove and protrudes into the plugging blind groove. The wire end contacting portions of the plurality of wire end terminals are parallel to one another and are disposed to be coplanar. The wire end contacting portion is formed by being bent and displaced from the wire end fixing portion. All the piercing portions of the wire end terminals form into two piercing rows, and in the two piercing rows, the piercing portions of different wire end terminals are disposed in a misaligned manner.

Preferably, a plate end connector plugged in and matched with the wire end connector is also included. The plate end connector has a plate end body, a plate end terminal disposed at the plate end body, and the plate end body is configured to be electrically connected to the wire end terminal. The plate end terminal has an extension arm and a concave hole disposed on the extension arm. The wire end body has a receding groove. The clasping arm has a pressing protrusion and a protruding clasp configured to protrude into the concave hole. An external object is in contact with the pressing protrusion so the clasping arm generates elastic deformation and enters the receding groove, and that the protruding clasp is removed from the concave hole.

Preferably, the plate end terminal has a soldering connection foot and two elastic clamping arms connected to the soldering connection foot. The soldering connection foot is configured to be soldered to an external circuit board. The two elastic clamping arms are configured to clamp and electrically connect the wire end terminal. A distance between two free ends of the two elastic clamping arms is less than a distance between ends of the two elastic clamping arms close to the soldering connection foot. The wire end body has a position limiting hole configured to accommodate the two elastic clamping arms. Avoidance recesses are provided at sides away from each other of ends of the two elastic clamping arms away from the soldering connection foot.

Preferably, the plate end connector further has a reinforcement soldering foot. The reinforcement soldering foot has two holding portions and two soldering connection portions. The two holding portions are disposed in parallel, and the holding portions are installed inside the plate end body. The two soldering connection portions are disposed to be coplanar. The soldering connection portions are configured to be soldered to an external circuit board. The plate end body has a positioning pillar. The external circuit board has a positioning hole configured to accommodate the positioning pillar, and the positioning pillar is located between the two soldering connection portions.

Advantages of the disclosure are provided as follows. When the wire end connector is required to be transported or delivered, the first clasping head protrudes into the pre-locking groove, and the protrusion is in contact with the free end of the clasping plate, and the groove wall of the pre-locking groove blocks and limits the first clasping head, so that the wire cover and the wire end body are pre-assembled together, and the piercing portion does not pierce the cable wire. The connector provided by the disclosure may prevent the wire cover and the wire end body from being tightly assembled or from being separated, so that wire harness manufacturers may encounter less trouble during transportation. Moreover, the connector may be packaged conveniently and the cable wire may be electrically connected easily, so that assembly costs are lowered and production efficiency is improved.

DESCRIPTION OF THE EMBODIMENTS

Figure 1:
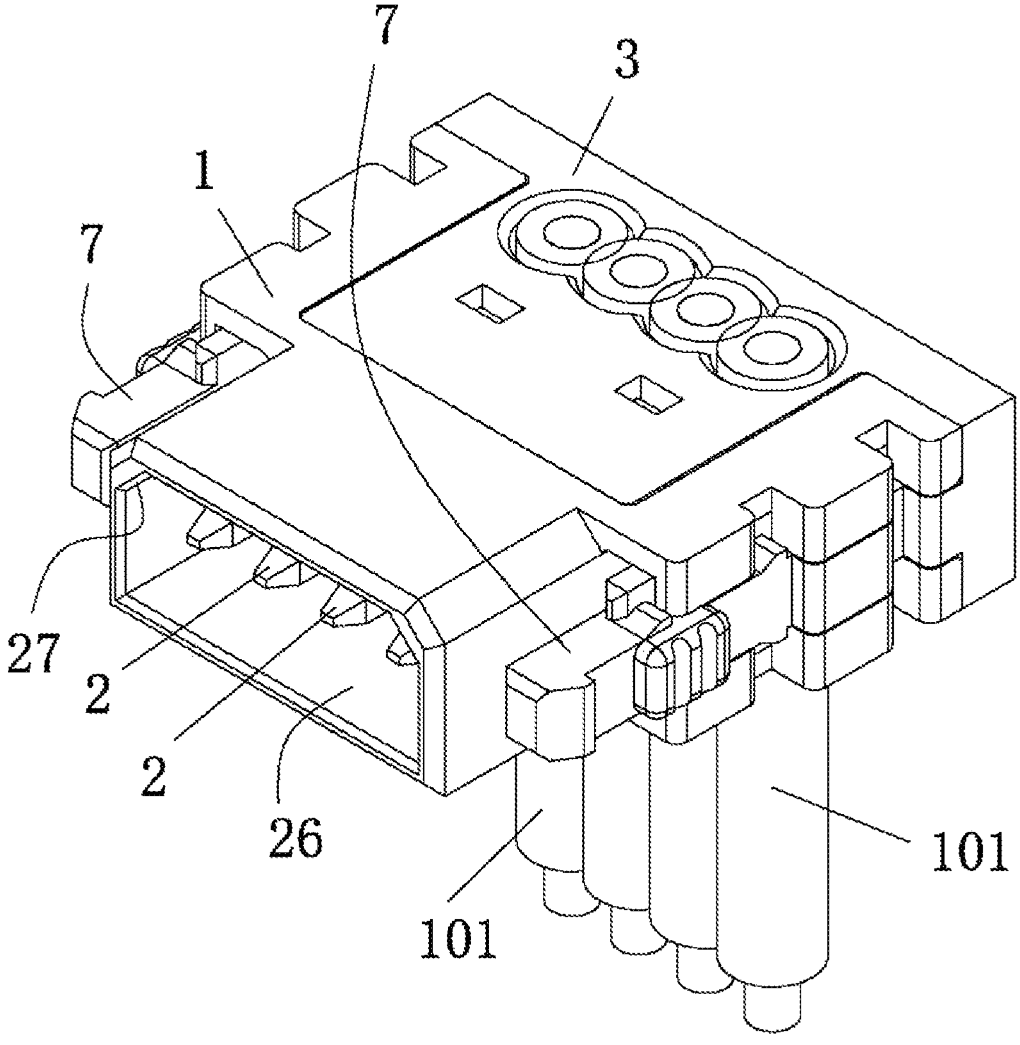
FIG. 1 is a schematic view of a structure of a wire end connector according to the disclosure.
Figure 2:
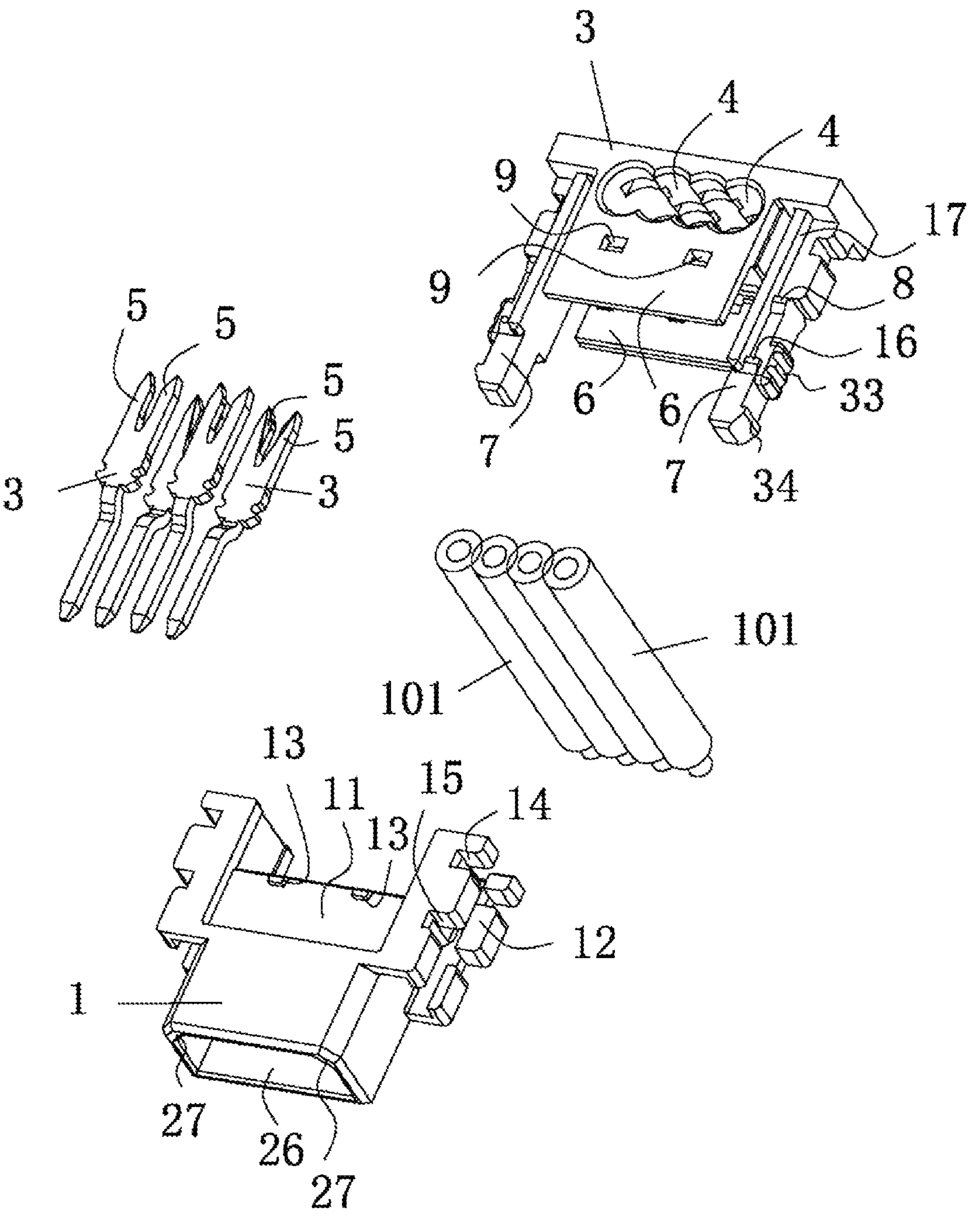
FIG. 2 is a schematic exploded view of the structure of the wire end connector according to the disclosure.
Figure 3:
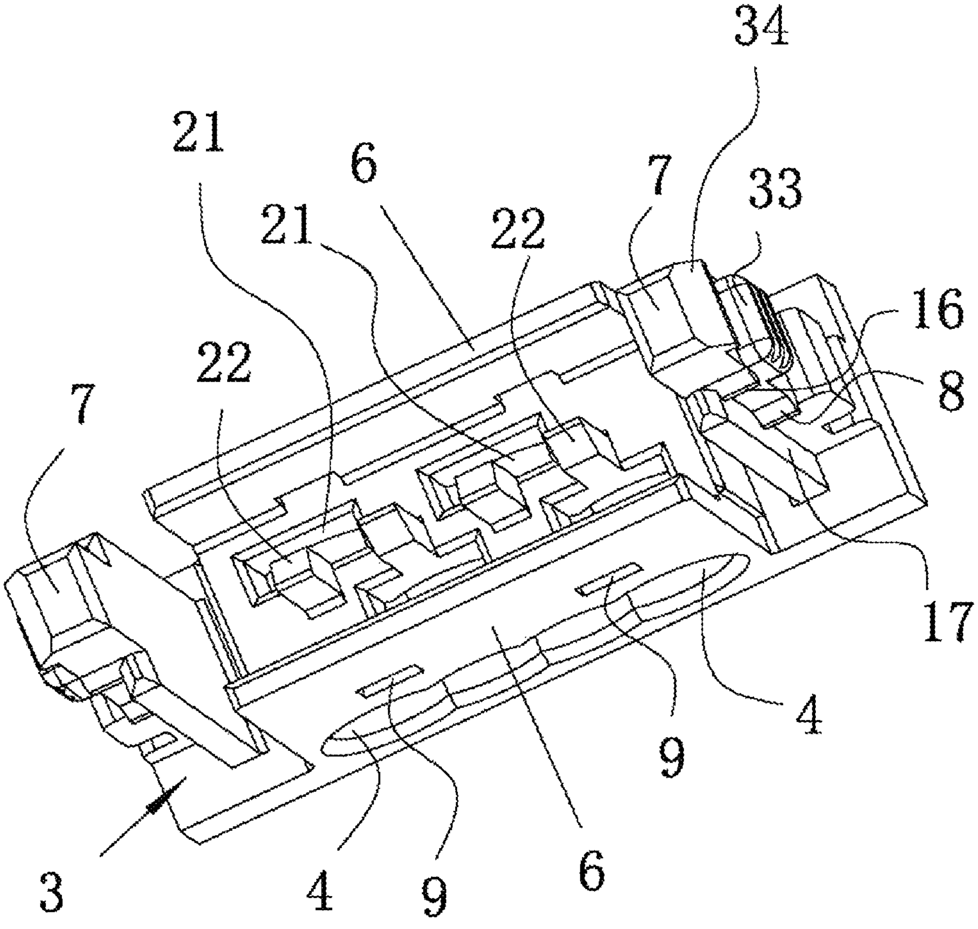
FIG. 3 is a schematic three-dimensional view of a structure of a wire cover according to the disclosure.
Figure 4:
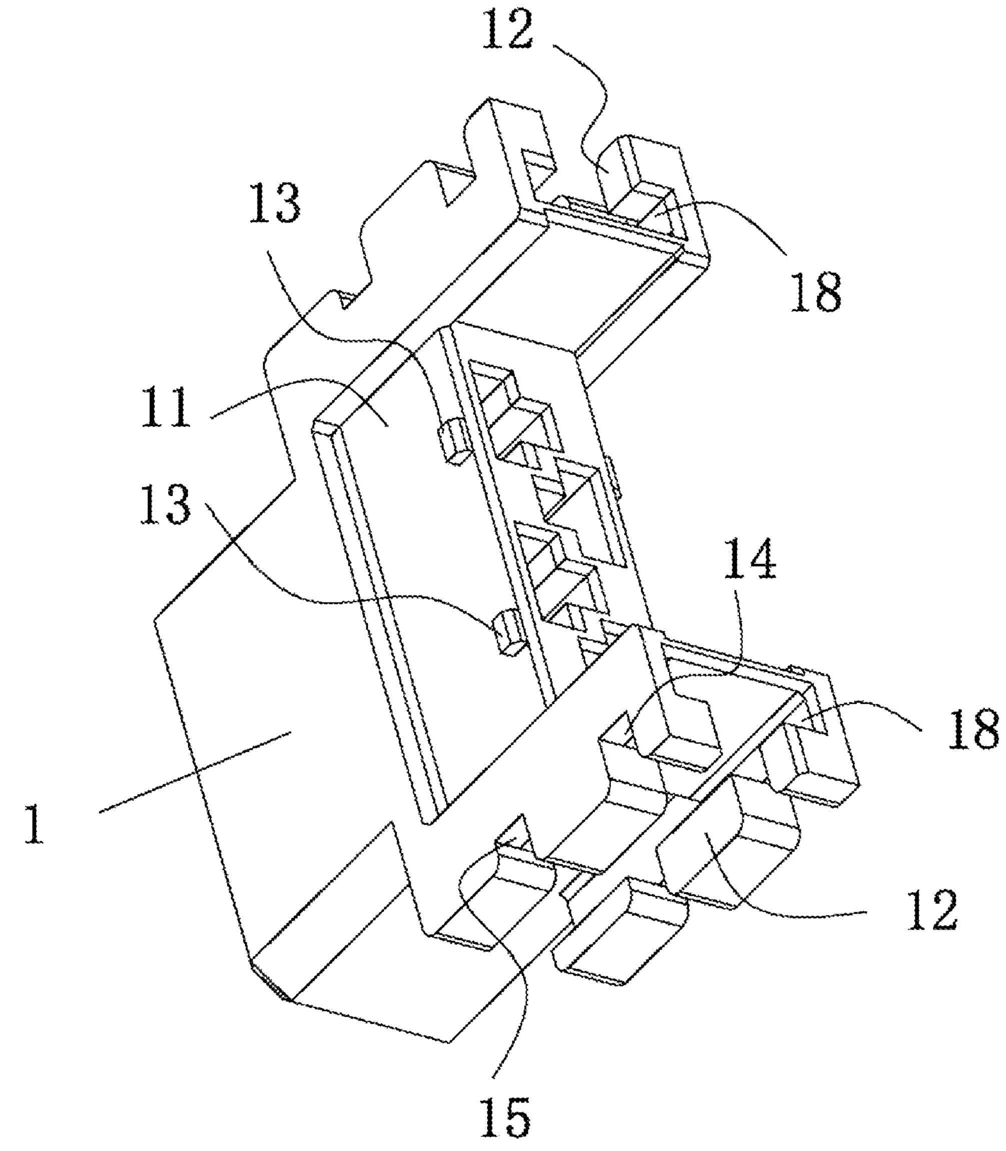
FIG. 4 is a schematic three-dimensional view of a structure of a wire end body according to the disclosure.
Figure 5:
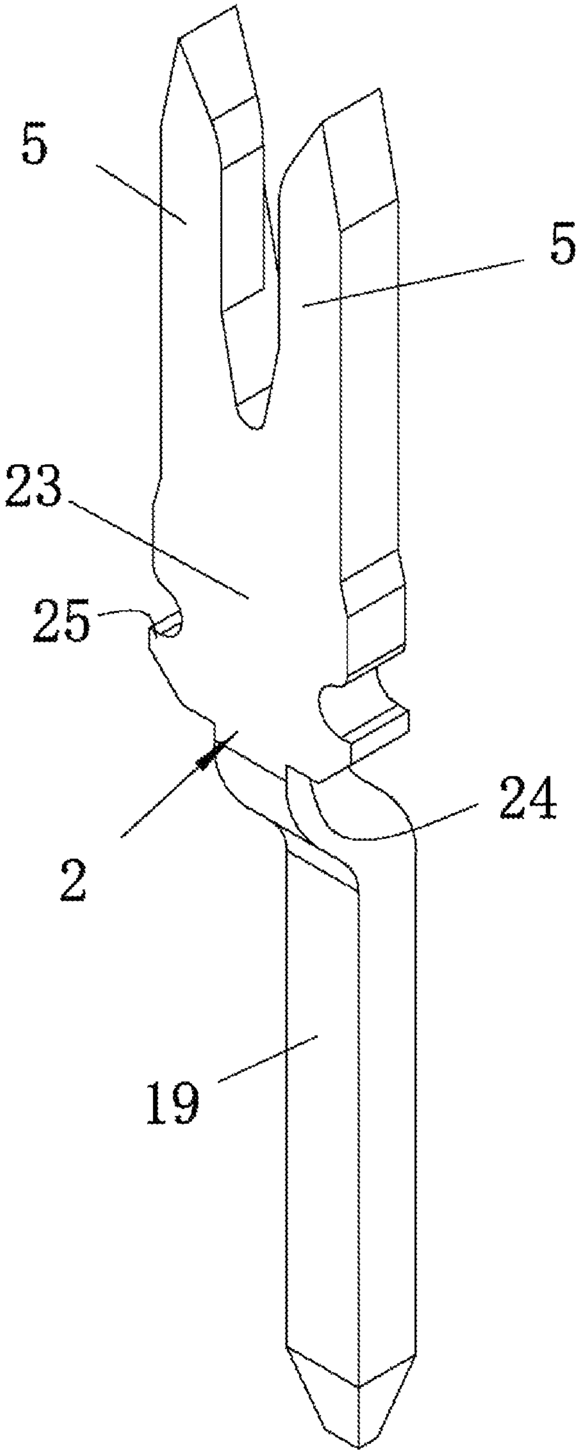
FIG. 5 is a schematic view of a structure of a wire end terminal according to the disclosure.
Figure 6:
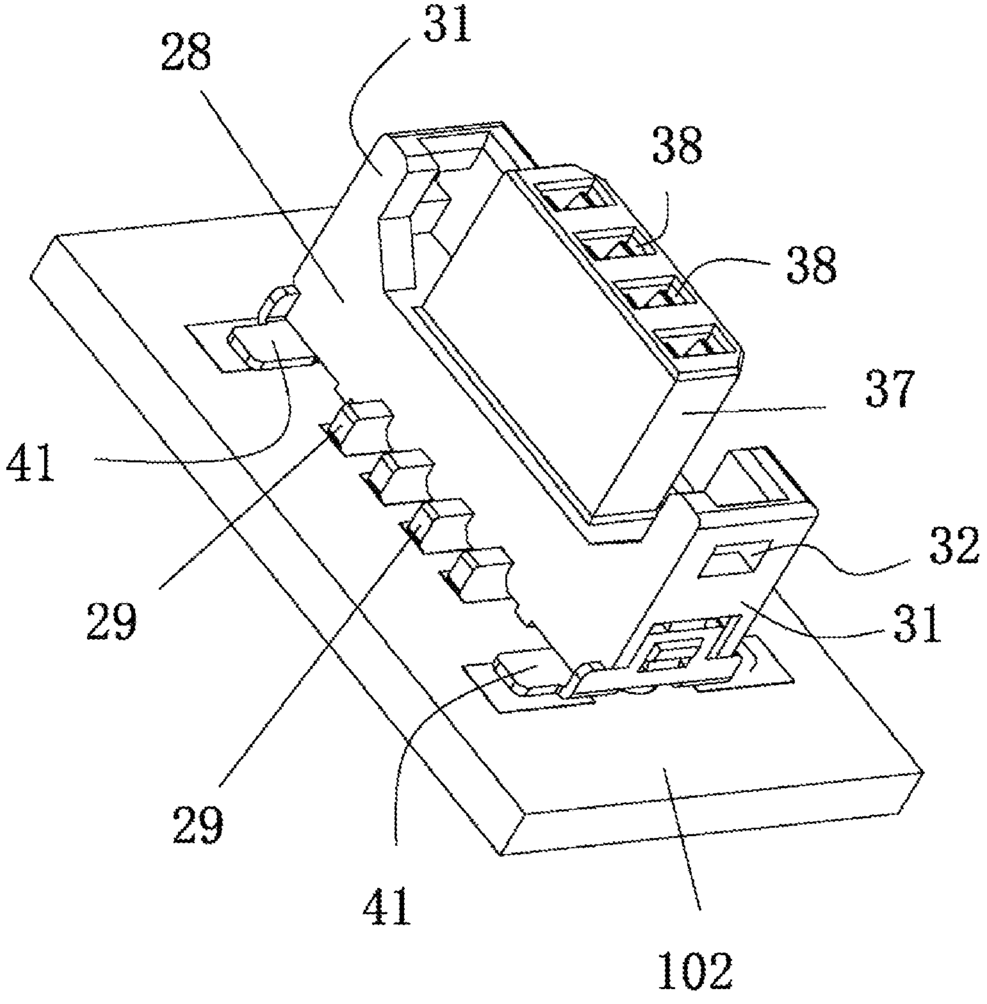
FIG. 6 is a schematic three-dimensional view of a structure of a plate end connector according to a first embodiment of the disclosure.
Figure 7:
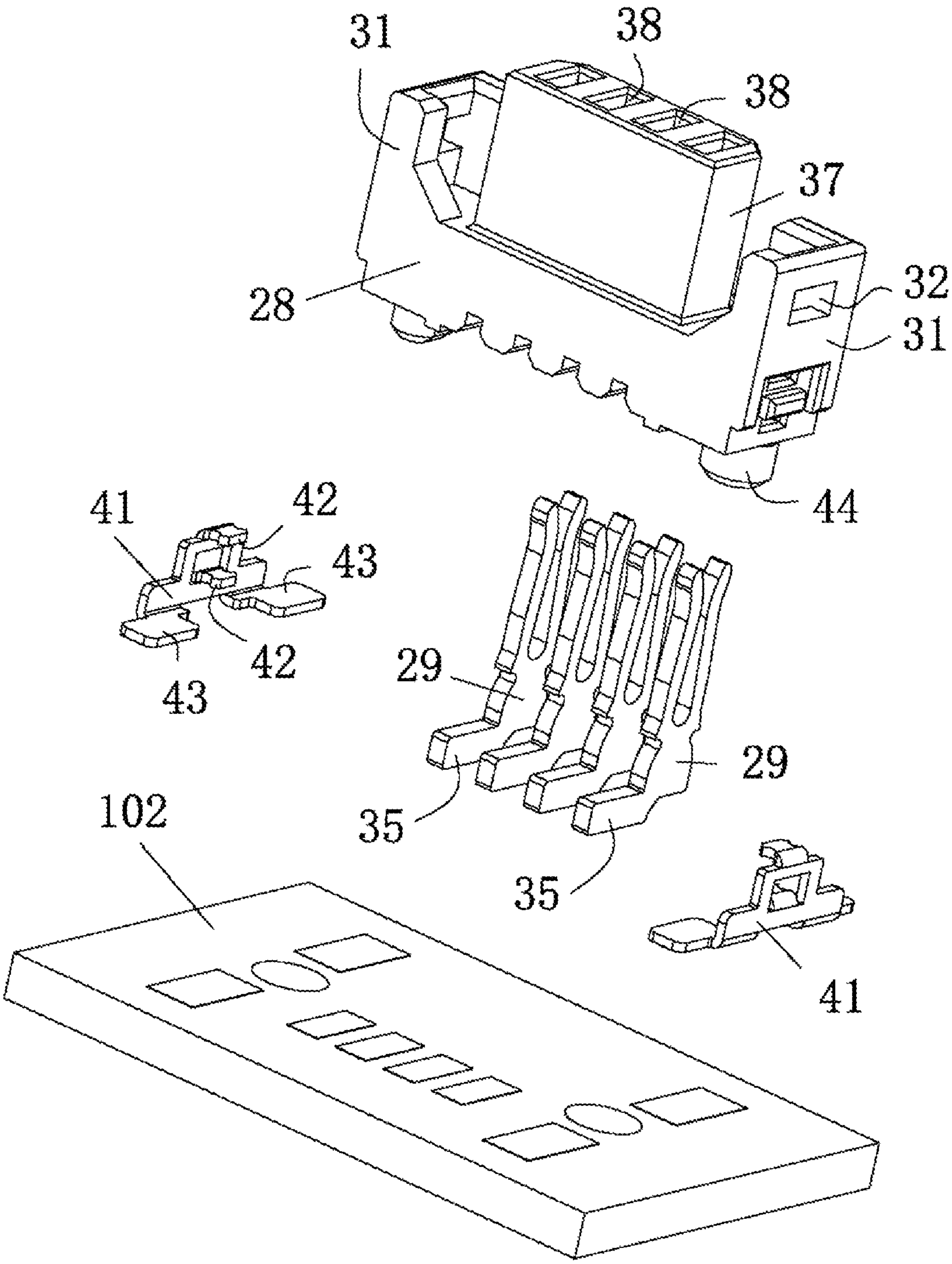
FIG. 7 is a schematic exploded view of the structure of the plate end connector according to the first embodiment of the disclosure.
Figure 8:
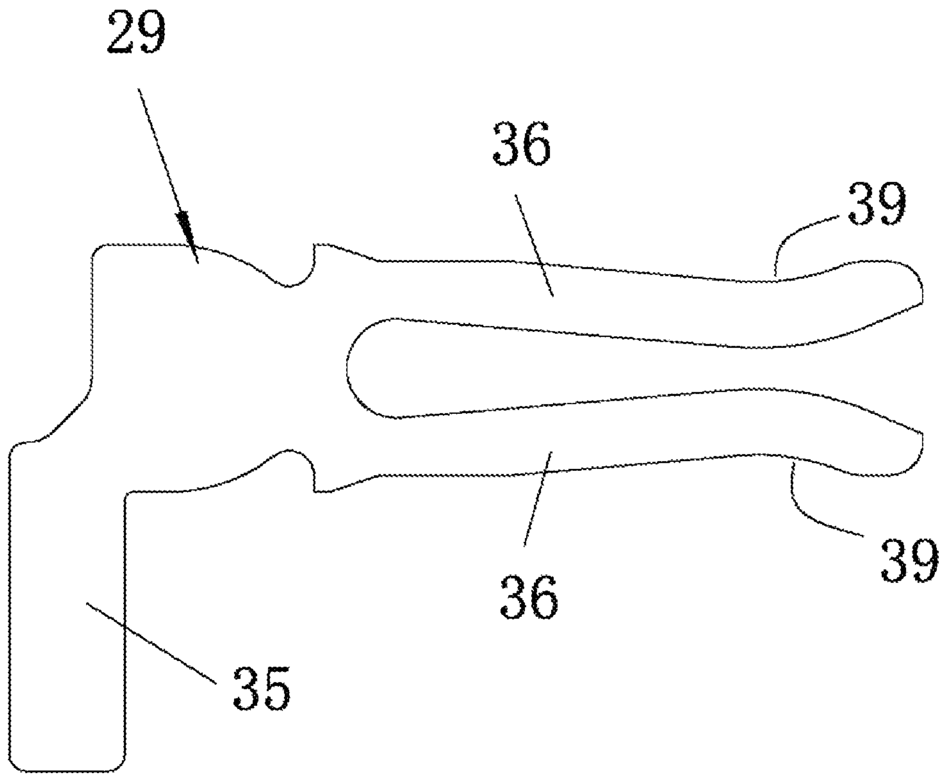
FIG. 8 is a schematic view of a structure of a plate end terminal according to the disclosure.

The following embodiments and accompanying drawings are included to provide a further understanding of the disclosure.

First Embodiment

With reference to FIG. 1 to FIG. 5, a piercing electrical connector provided by the disclosure includes a wire end connector. The wire end connector has a wire end body 1, a wire end terminal 2 disposed on the wire end body 1, a wire cover 3 engaged and matched with the wire end body 1. The wire end body 1 and the wire cover 3 are both made of insulating plastic materials, for example, the wire end body 1 and the wire cover 3 are both formed by injection molding of injection molds. The wire cover 3 has wire accommodation holes 4 configured to accommodate external cable wires 101, and the cable wires 101 may be inserting flat wires or scattered wires. For instance, the cable wires 101 may be the common wire numbers, such as AWG22, AWG24, or AWG26 and the like, and a hole diameter of the wire accommodation holes 4 may be adjusted according to different wire numbers. Preferably, the wire accommodation holes 4 penetrate the wire cover 3, and in this way, after the cable wires 101 are inserted into the wire accommodation holes 4, a user may easily see whether the cable wires 101 are accurately installed into the positions. The wire end terminal 2 has piercing portions 5, and the piercing portions 5 are configured to pierce insulating layers of the cable wires 101 accommodated in the wire accommodation holes 4 of the wire cover 3 and are in contact with conducting bodies of the cable wires 101, so that the wire end terminal 2 and the cable wires 101 are electrically connected.

The wire cover 3 has a clasping plate 6, a clasping arm 7, and a first clasping head 8 protruding from and formed on the clasping arm 7. A plane on which the clasping plate 6 is located and a plane on which the clasping arm 7 is located are substantially perpendicular to each other. The first clasping head 8 is formed by protruding from a side surface of the clasping arm 7, and an engaging hole 9 is disposed on the clasping plate 6. The wire end body 1 has a clasping groove 11, a clasping hole 12, a protrusion 13 located in the clasping groove 11, a pre-locking groove 14 and a locking groove 15 communicating the clasping hole 12. The pre-locking groove 14 and the locking groove 15 are disposed in a misaligned manner in a length direction of the clasping hole 12. The clasping groove 11 and the clasping hole 12 are respectively disposed on different side walls of the wire end body 1. In this embodiment, the side wall on which the clasping groove 11 is located and the side wall on which the clasping hole 12 is located are perpendicular to each other, the clasping groove 11 is configured to accommodate the clasping plate 6, and the clasping hole 12 is configured to accommodate the clasping arm 7.

When the wire end connector is required to be transported or moved, the first clasping head 8 protrudes into the pre-locking groove 14, the protrusion 13 is in contact with a free end of the clasping plate 6, and a groove wall of the pre-locking groove 14 blocks and limits the first clasping head 8, so that the wire cover 3 and the wire end body 1 are pre-assembled together. As such, on one hand, the wire cover 3 is prevented from moving forward with respect to the wire end body 1; on the other hand, the wire cover 3 is prevented from moving backward relative to the wire end body 1, and the piercing portions 5 do not pierce the cable wires 101 at the moment. The wire cover 3 and the wire end body 1 are prevented from being tightly assembled or from being separated, so that wire harness manufacturers may encounter less trouble during transportation. Moreover, the connector may be packaged conveniently and the cable wires 101 may be electrically connected easily, so that assembly cost is lowered and production efficiency is improved.

When the cable wires 101 in the wire accommodation holes 4 are required to be electrically connected to the wire end terminal 2, the wire end body 1 or the wire cover 3 is pressed, so that the two move relatively until the first clasping head 8 protrudes into the locking groove 15, the protrusion 13 protrudes into the engaging hole 9, and the groove wall of the locking groove 15 is in contact with the first clasping head 8. Preferably, the engaging hole 9 penetrates through the clasping plate 6, and in this way, the user may directly see whether the protrusion 13 enters the engaging hole 9. A hole wall of the engaging hole 9 is in contact with and blocks the protrusion 13, so that the wire cover 3 is prevented from being detached from the wire end body 1 and the wire cover 3 and the wire end body 1 are assembled together securely. At the moment, the piercing portions 5 pierce the insulating layers of the cable wires 101, so the wire end terminal 2 and the cable wires 101 are electrically connected.

In this embodiment, a number of the clasping plate 6 is two, and the two clasping plates 6 are respectively located at two front and rear sides of the wire cover 3. Certainly, a number of the clasping groove 11 is two as well, and the two clasping grooves 11 respectively accommodate the two clasping plates 6. Each of the clasping plates 6 has two engaging holes 9, each of the clasping grooves 11 has two protrusions 13, and the two engaging holes 9 are respectively configured to accommodate the two protrusions 13. The groove walls of sides of the two clasping grooves 11 close to each other respectively are in contact with and block external surfaces of the two clasping plates 6 close to each other, so that the wire cover 3 is prevented from moving back and forth with respect to the wire end body 1.

Before the piercing portions 5 pierce the insulating layers of the cable wires 101, a total of four protrusions 13 in the two clasping grooves 11 are configured to stop the wire cover 3. After the piercing portions 5 pierce the insulating layers of the cable wires 101, the total of four protrusions 13 in the two clasping grooves 11 enter the four engaging holes 9 of the two clasping plates 6, and the hole walls of the engaging holes 9 are in contact with the protrusions 13 to prevent the wire cover 3 from removal, so that a stop effect is provided. In actual manufacturing, heights of the protrusions 13 and sizes of chamfers 13 of the protrusions 13 may be adjusted, so that magnitude of an advancing stop effect performed to the wire cover 3 is adjusted.

A number of the clasping arm 7 is two, and the two clasping arms 7 are located at two left and right sides of the wire cover 3. Correspondingly, a number of the clasping hole 12 is two as well, and the two clasping holes 12 are respectively located at left and right sides of the wire end body 1. The two clasping holes 12 respectively accommodate the two clasping arms 7, so that the wire cover 3 is ensured to be securely assembled to the wire end body 1, and the two are prevented from being detached from each other or from moving relatively owning to insecure engagement. Moreover, the hole walls of sides of the two clasping holes 12 close to each other are in contact with and block external surfaces of sides of the two clasping arms 7 close to each other, so that the wire cover 3 is prevented from moving left and right with respect to the wire end body 1.

A second clasping head 16 is disposed on the clasping arm 7. The first clasping head 8 and the second clasping head 16 are disposed in a misaligned manner in a length direction of the clasping arm 7. The second clasping head 16 is closer to a free end of the clasping arm 7 than the first clasping head 8. The first clasping head 8 and the second clasping head 16 are formed by protruding from a same side of the clasping arm 7. In this embodiment, one first clasping head 8 and one second clasping head 16 are disposed on each side of the left and right sides of each of the clasping arms 7, and the first clasping heads 8 at the two sides of each of the clasping arms 7 are symmetrically disposed relative to a central axis of each of the clasping arms 7.

In this embodiment, each of the clasping arms 7 has two first clasping heads 8 and two second clasping heads 16. Before the piercing portions 5 pierce the insulating layers of the cable wires 101, the two clasping arms 7 having a total of eight clasping heads respectively protrude into a corresponding pre-locking groove 14 and the locking groove 15, so that the wire cover 3 is prevented from moving forward with respect to the wire end body 1 and the wire cover 3 is prevented from moving backward with respect to the wire end body 1. After the piercing portions 5 pierce the insulating layers of the cable wires 101, since the two clasping arms 7 having the total of eight clasping heads are located in a different groove, the wire cover 3 is prevented from being removed out from the wire end body 1, and that the stop effect is provided.

When the wire end body 1 and the wire cover 3 are transported or moved, the first clasping heads 8 protrude into the pre-locking groove 14, the protrusions 13 are in contact with the free ends of the clasping plates 6, and the second clasping heads 16 protrude into the locking groove 15, so that the wire cover 3 and the wire end body 1 are pre-assembled together, and the piercing portions do not pierce the cable wires 101 at this moment.

When the wire end terminal 2 is required to be connected to the cable wires 101, the wire cover 3 may be moved with respect to the wire end body 1 until the first clasping heads 8 protrude into the locking groove 15, the protrusions 13 protrude into the engaging holes 9, and the second clasping heads 16 move out of the clasping holes 12 and are in contact with an external surface of the wire end body 1. In this way, the wire cover 3 and the wire end body 1 are securely assembled together, and since the groove wall of the locking groove 15 is in contact with and blocks the first clasping heads 8, the hole walls of the engaging holes 9 are in contact with and block the protrusions 13, and the external surface of the wire end body 1 is in contact with and blocks the second clasping heads 16, the wire end body 1 is prevented from being detached from the wire cover 3. At the moment, the piercing portions 5 pierce the insulating layers of the cable wires 101, so the wire end terminal 2 and the cable wires 101 are electrically connected.

Each of the clasping arms 7 has a side away from the other one of the clasping arms 7. Guide plates 17 are respectively disposed at the sides of the clasping arms 7 away from each other, and the guide plates 17 located at the two sides of the clasping arms 7 are symmetrically disposed with respect to the central axis of the clasping arms 7. Each of the clasping arms 7 and the corresponding guide plate 17 are integrally formed, and a combination of cross sections of each of the clasping arms 7 and each of the guide plates 17 is substantially T-shaped. The wire end body 1 has guide holes 18 communicating the clasping holes 12. A width of each of the guide holes 18 is greater than a width of each of the clasping holes 12. Both the guide plates 17 at the two sides of the clasping arms 7 protrude into the guide holes 18.

As the guide plates 17 are matched with the guide holes 18, it is ensured that the clasping arms 7 may move on the wire end body 1 in a correct direction. In this way, the wire cover 3 is accurately plugged onto the wire end body 1, and that a plugging yield of the wire cover 3 and the wire end body 1 is improved. The hole walls of the guide holes 18 block and are in contact with the guide plates 17, and at the same time, the clasping arms 7 are prevented from being detached from the wire end body 1 in a width direction of the wire end body 1.

With reference to FIG. 1 to FIG. 6, the wire end terminal 2 further includes a wire end contacting portion 19 connected to the piercing portions 5, and the wire end contacting portion 19 is substantially straight-shaped. One end of each of the piercing portions 5 away from the wire end contacting portion 19 protrudes out of the wire end body 1. The wire cover 3 has first receding holes 21 communicating the wire accommodation holes 4, and the first receding holes 21 and the wire accommodation holes 4 are disposed in a transverse manner. In this embodiment, a central axis of the first receding holes 21 and a central axis of the wire accommodation holes 4 are perpendicular to each other. The piercing portions 5 pierce the insulating layers of the cable wires 101 in the wire accommodation holes 4 through the first receding holes 21.

A moving direction of the piercing portions 5 may be guided by the first receding holes 21, so that the piercing portions 5 are prevented from moving in a wrong direction, which may cause the piercing portions not to be able to pierce the insulating layers of the cable wires 101. At the same time, hole walls of the first receding holes 21 limit and block the piercing portions 5, so that the piercing portions 5 are prevented from being bent and deformed, which may cause the piercing portions not be able to pierce the insulating layers of the cable wires 101.

The wire end body 1 has a second receding hole (not shown in the drawings) exposing the piercing portions 5 and being close to the wire end contacting portion 19, and the wire cover 3 has a supporting pillar 22 protruding into the second receding hole. The supporting pillar 22 is substantially rectangular and straight. When the piercing portions 5 enter the first receding holes 21, the supporting pillar 22 is inserted into the second receding hole at the same time. The wire end terminal 2 is tightly clamped by the supporting pillar 22 and a hole wall of the second receding hole to improve strength of the wire end terminal 2 in an auxiliary manner. The wire end terminal 2 is prevented from being bent and deformed, which may cause the insulating layers of the cable wires 101 from being pierced normally, and a piercing yield of the piercing portions 5 piercing the cable wires 101 is thereby improved.

In this embodiment, a hole position accommodating the wire end terminal 2 on the wire end body 1 and the second receding hole form a T shape together. In this way, when the wire end terminal 2 is assembled to the wire end body 1, the wire end terminal 2 is ensured to be assembled into the wire end body 1 in a correct direction, so that an assembly yield of the wire end body 1 and the wire end terminal 2 is improved.

The wire end terminal 2 further includes a wire end fixing portion 23, and the wire end fixing portion 23 is configured to fix the wire end terminal 2 in the wire end body 1. The wire end terminal 2 is integrally formed as one piece, and the wire end terminal 2 is formed by die-cutting and bending a conductive metal. The wire end contacting portion 19 and the piercing portions 5 respectively extend from two ends of the wire end fixing portion 23 away from each other.

The wire end fixing portion 23 has an advancing stop position 24 and a stopping hook 25, and the wire end body 1 has advancing stop stairs configured to block the advancing stop position 24. Since the advancing stop position 24 is matched with the advancing stop stairs, the wire end fixing portion 23 is prevented from being excessively inserted into the wire end body 1. The stopping hook 25 protrudes into the wire end body 1, so that the wire end terminal 2 is prevented from being removed out from the wire end body 1 through the stopping hook 25.

In this embodiment, a hole of the wire end body 1 accommodating the wire end contacting portion 19 is shaped as a rectangular, and a degree of parity of the wire end contacting portion 19 of the wire end terminal 2 is ensured. On the one hand, an assembly yield of the wire end terminal 2 and the wire end body 1 is improved; on the other hand, the wire end contacting portion 19 is prevented from malfunctioning when rotating with respect to the wire end body 1.

In this embodiment, a number of the piercing portion 5 is two. The two piercing portions 5 are symmetrically disposed relative to a central axis of the wire end fixing portion 23, and the two piercing portions 5 are configured to clamp the cable wires 101 in the wire accommodation holes 4. Sides of the two piercing portions 5 close to each other are configured to pierce the insulating layers of the cable wires 101 in the wire accommodation holes 4. Via the disposition of the two piercing portions 5, the piercing portions 5 are prevented from being unable to pierce normally owing to damage of one of the piercing portions 5, and in this way, an electrical connection yield of the wire end terminal 2 and the cable wires 101 is further improved.

A number of the wire end terminal 2 is plural. In this embodiment, the number of the wire end terminals 2 is four. Certainly, according to actual needs, the number of the wire end terminals 2 may be six, eight, twenty, etc. The wire end body 1 has a plugging blind groove 26. The plugging blind groove 26 is recessed from the external surface of the wire end body 1, and a corner of the plugging blind groove 26 has a foolproof portion 27. Preferably, a main body shape of a cross section of the inserting blind groove 26 is a rectangle. Two adjacent corners of the plugging blind groove 26 both have the foolproof portions 27, so that the entire plugging blind groove 26 is D-shaped. When the wire end connector is connected to the outside through connection, plugging, and matching, the foolproof function of the wire end connector is accomplished.

The wire end contacting portion 19 penetrates a bottom wall of the plugging blind groove 26 and protrudes into the plugging blind groove 26. The wire end contacting portions 19 of the plurality of wire end terminals 2 are parallel to one another and are disposed to be coplanar. The wire end contacting portions 19 of the plurality of wire end terminals 2 are equally spaced apart, and each of the wire end contacting portions 19 is formed by being bent and displaced from the wire end fixing portion 23. That is, a plane on which the wire end contacting portion 19 is located and a plane on which the wire end fixing portion 23 is located are spaced apart from each other and are disposed in parallel. All the piercing portions 5 of the wire end terminals 2 form into two piercing rows, and the piercing portions 5 of different wire end terminals 2 in the two piercing rows are disposed in a misaligned manner.

Through the displacement structure provided for the wire end contacting portion 19 and the wire end fixing portion 23, distances among the piercing portions 5 of the plurality of wire end terminals 2 are greatly increased. In this way, when the piercing portions 5 pierce the insulating layers of the cable wires 101, two adjacent wire end terminals 2 are prevented from interfering each other, so that a manufacturing yield of the wire end terminal is improved.

With reference to FIG. 1 to FIG. 7, a plate end connector plugged in and matched with the wire end connector is also included. The plate end connector has a plate end body 28 and a plate end terminal 29 disposed in the plate end body 28. The plate end body 28 is plugged in and matched with the wire end body 1, and the plate end terminal 29 is configured to be electrically connected to the wire end contacting portion 19 of the wire end terminal 2.

In this embodiment, the plate end body 28 has an extension arm 31 and a concave hole 32 disposed on the extension arm 31. The wire end body 1 has a receding groove (not labeled in the drawings). The clasping arm 7 has a pressing protrusion 33 and a protruding clasp 34 configured to protrude into the concave hole 32. After the plate end connector is plugged in the wire end connector, the protruding clasp 34 protrudes into the concave hole 32. Preferably, the concave hole 32 penetrates through the extension arm 31, so that the user may conveniently and directly see whether the protruding clasp 34 is accurately assembled into the concave hole 32. A side wall of the concave hole 32 is in contact with and blocks the protruding clasp 34, so that plate end connector is prevented from being detached from the wire end connector, and the two are ensured to be electrically connected securely.

When the plate end connector is required to be detached from the wire end connector, an external object (e.g., a finger of the user or a mechanical hand and the like) is in contact with the pressing protrusion 33, so that the clasping arm 7 generates elastic deformation. After being elastically deformed, the clasping arm 7 moves and enters the receding groove, so that the protruding clasp 34 moves along with the clasping arm 7 and thus removes out from the concave hole 32. The wire end connector may then be detached from the plate end connector.

In this embodiment, each of the left and right sides of the plate end body 28 has one extension arm 31, and the clasping arms 7 located at two sides of the wire end body 1 are respectively matched with the extension arms 31 located at two sides of the plate end body 28. After the wire end body 1 is plugged in the plate end body 28, it is ensured that equal forces are applied to two ends of each of the bodies, so that the wire end body 1 and the plate end body 28 may be securely assembled together. Preferably, a recessed groove (not labeled in the drawings) is disposed at each of the sides close to each other of the extension arms 31 located at the two sides of the plate end body 28, and the recessed grooves at the two sides of the plate end body 28 are configured to accommodate the clasping arms 7 of the two sides of the wire end body 3.

With reference to FIG. 1 to FIG. 8, each of the plate end terminals 29 has a soldering connection foot 35 and two elastic clamping arms 36 connected to the soldering connection foot 35. The two elastic clamping arms 36 are spaced apart from each other, and the soldering connection foot 35 is configured to be soldered to an external circuit board 102. The two elastic clamping arms 36 are configured to clamp and electrically connect the wire end contacting portion 19 of the wire end terminal 2. A distance between two free ends of the two elastic clamping arms 36 is less than a distance between two ends of the two elastic clamping arms close to one end of the soldering connection foot 35. In this embodiment, surface mounting-type soldering is applied to the soldering connection foot 35. That is, the soldering connection foot 35 is soldered to the external circuit board 102 through SMT.

In this embodiment, the plate end connector is installed in a vertical manner. That is, a corresponding surface of the plate end connector is perpendicular to the external circuit board 102. The wire end body 1 has a tongue portion 37 and position limiting hole 38 disposed on the tongue portion 37, and the tongue portion 37 is perpendicular to the external circuit board 102. The soldering connection foot 35 is perpendicular to the elastic clamping arms 36. The tongue portion 37 is configured to be plugged into the plugging blind groove 26. The position limiting hole 38 is recessed from an end surface of a free end of the tongue portion 37, and the position limiting hole 38 is configured to accommodate the two elastic clamping arms 36. Avoidance recesses 39 are provided at sides away from each other of ends of the two elastic clamping arms 36 away from the soldering connection foot 35.

When the wire end connector is plugged in the plate end connector, the tongue portion 37 protrudes into the plugging blind groove 26, and the wire end contacting portion 19 protrudes between the two elastic clamping arms 36 in the position limiting hole 38. When the wire end contacting portion 19 enters between the two elastic clamping arms 36, since the distance between the two free ends of the two elastic clamping arms 36 is less than the distance between the two ends of the two elastic clamping arms 36 close to one end of the soldering connection foot 35, the wire end contacting portion 19 pushes the two elastic clamping arms 36. In this way, the two elastic clamping arms 36 move in directions away from each other, so the wire end terminal 2 and the plate end terminal 29 are electrically connected securely owing to an elastic restoring force of the two elastic clamping arms 36.

As the avoidance recesses 39 are provided, when the wire end contacting portion 19 pushes the elastic clamping arms 36 to move so that the free ends of the elastic clamping arms 36 are in contact with the hole wall of the position limiting hole 38, the free ends of the elastic clamping arms 36 are ensured to generate elastic deformation, and that the wire end contacting portion 19 is stably inserted between the two elastic clamping arms 36.

The plate end connector 41 further includes a reinforcement soldering foot 41. The reinforcement soldering foot 41 has two holding portions 42 and two soldering connection portions 43, and the two holding portions 42 are spaced apart from each other and are disposed in parallel. One of the holding portions 42 is torn from a main body of the reinforcement soldering foot 41. A blank hole is formed after the main body of the reinforcement soldering foot 41 is torn, and the plate end body 28 has a protruding platform protruding into the blank hole. As the protruding platform and the blank hole are matched, the reinforcement soldering foot 41 is prevented from moving with respect to the wire end body 28. The holding portions 42 are assembled into the plate end body 28, so that the reinforcement soldering foot 41 is securely installed in the plate end body 28.

The two soldering connection portions 43 are in coplanar arrangement, and are configured to be soldered to the external circuit board 102. In actual applications, the soldering connection foot 35 of the plate end terminal 29 and the two soldering connection portions 43 are all soldered onto the external circuit board 102, so that the plate end connector is securely fixed onto the circuit board 102, and the plate end connector is prevented from being detached.

In this embodiment, a number of the reinforcement soldering foot 41 is two, and the two reinforcement soldering feet 41 are respectively located at left and right sides of the plate end body 28. As the two reinforcement soldering feet 41 are provided, on one hand, the plate end body 28 is securely soldered onto the circuit board; on the other hand, the two reinforcement soldering feet 41 position the plate end body 28, so that the plate end body 28 is prevented from being detached from the reinforcement soldering feet 41.

The plate end body 28 has a positioning pillar 44. A length direction of the positioning pillar 44 is parallel to a length of the tongue portion 37, and the positioning pillar 44 protrudes from a lower surface of the plate end body 28. The external circuit board 102 has a positioning hole configured to accommodate the positioning pillar 44. When the plate end connector is matched with the circuit board 102, the positioning pillar 44 is inserted into the positioning hole. As the positioning pillar 44 is matched with the positioning hole, the plate end connector may be ensured to be rapidly and accurately positioned onto the circuit board 102, so that installation efficiency of the plate end connector and the circuit board 102 is improved.

In this embodiment, the positioning pillar 44 is located between the two soldering connection portions 43. In this way, after the two soldering connection portions 43 are soldered onto the circuit board 102, equal forces are applied to the plate end body 28 at the two sides of the positioning pillars 44. The plate end body 28 is thus prevented from being fixed insecurely owing to unbalanced force applications, so that the plate end connector may be fixed to the circuit board securely.

Second Embodiment

Figure 9:
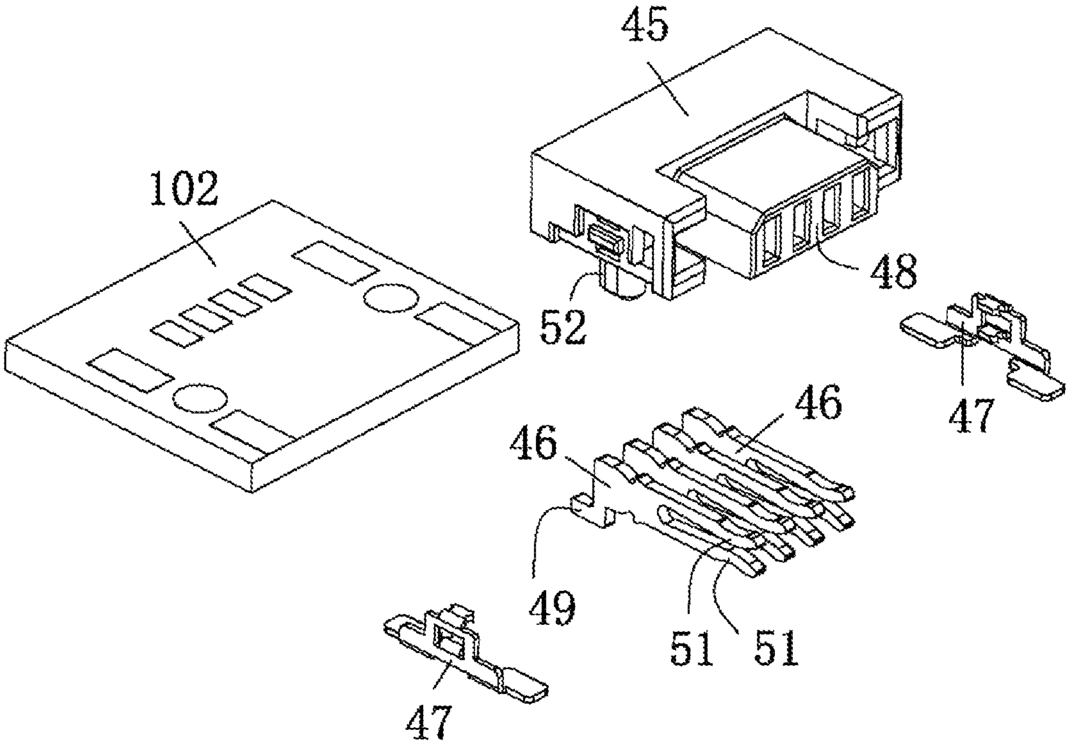
FIG. 9 is a schematic exploded view of the structure of the plate end connector according to a second embodiment of the disclosure.

With reference to FIG. 9, in this embodiment, the plate end connector is installed in a horizontal manner. The plate end connector includes an insulating body 45, conductive terminals 46 installed on the insulating body 45, and two reinforcement soldering sheets 47 installed at left and right sides of the insulating body 45. A structure of the insulating body 45 is substantially similar to the structure of the plate end body 28, and a structure of the conductive terminals 46 is substantially similar to the structure of the plate end terminals 29, so description thereof is not repeated herein. The structure of the reinforcement soldering foot 41 is identical to a structure of the reinforcement soldering sheets 47.

The insulating body 45 has a tongue plate 48. The tongue plate 48 protrudes from a middle portion of a front end surface of the insulating body 45, and the tongue plate 48 is parallel to the external circuit board 102. The conductive terminals 46 have soldering plate portions 49 and elastic guiding portions 51. The soldering plate portions 49 are configured to be soldered onto the circuit board 102, the elastic guiding portions 51 are configured to be electrically connected to wire end contacting portion 19, and the soldering plate portions 49 and the elastic guiding portions 51 are disposed in parallel arrangement.

The insulating body 45 has a positioning pillar 52. The positioning pillar 52 integrally protrudes from a lower surface of the insulating body 45, and a length direction of the positioning pillar 52 is parallel to a length direction of the tongue plate 48.

The rest of the content of this embodiment is identical to that of the first embodiment, explanation provided in the first embodiment is adopted for the features which are not explained in this embodiment and is not repeated hereinafter.

The above description is only preferred embodiments of the disclosure, and the content of the specification of the disclosure should not be understood as limitation to the disclosure.

What is claimed is:

1. A piercing electrical connector, comprising a wire end connector, wherein the wire end connector has a wire end body, a wire end terminal disposed on the wire end body, and a wire cover engaged and matched with the wire end body, the wire cover has a wire accommodation hole configured to accommodate an external cable wire, the wire end terminal has a piercing portion, and the piercing portion is configured to pierce an insulating layer of the cable wire of the wire cover so that the wire end terminal is electrically connected to the cable wire; wherein the wire cover further has a clasping plate, a clasping arm, and a first clasping head protruding from and formed on the clasping arm, and the clasping plate is provided an engaging hole, wherein the wire end body has a clasping groove, a clasping hole, a protrusion located in the clasping groove, a pre-locking groove and a locking groove in communication with the clasping hole, the pre-locking groove and the locking groove are disposed in a misaligned manner in a length direction of the clasping hole, the clasping groove is configured to accommodate the clasping plate, and the clasping hole is configured to accommodate the clasping arm; the first clasping head protrudes into the pre-locking groove, the protrusion is in contact with a free end of the clasping plate, such that the wire cover and the wire end body are pre-assembled together, and the piercing portion does not pierce the cable wire; the first clasping head protrudes into the locking groove, and the protrusion protrudes into the engaging hole, so that the wire cover and the wire end body are assembled together, and the piercing portion pierces the insulating layer of the cable wire so that the wire end terminal is electrically connected to the cable wire.

2. The piercing electrical connector as claimed in claim 1, wherein the clasping arm has a second clasping head, the first clasping head protrudes into the pre-locking groove, the protrusion is in contact with the free end of the clasping plate, and the second clasping head protrudes into the locking groove, so that the wire cover and the wire end body are pre-assembled together, and the piercing portion does not pierce the cable wire, and the first clasping head protrudes into the locking groove, the protrusion protrudes into the engaging hole, and the second clasping head moves out of the engaging hole, such that the wire cover and the wire end body are assembled together, and the piercing portion pierces the insulating layer of the cable wire so that the wire end terminal is electrically connected to the cable wire.

3. The piercing electrical connector as claimed in claim 1, characterized in that guide plates are respectively disposed on two sides of clasping arms away from each other, the wire end body has a guide hole communicating the clasping hole, a width of the guide hole is greater than a width of the clasping hole, and both the guide plates respectively at the two sides of the clasping arms protrude into the guide hole.

4. The piercing electrical connector as claimed in claim 1, wherein the wire end terminal further has a wire end contacting portion connected to the piercing portion, the piercing portion has an end disposed away from the wire end contacting portion and protruding out of the wire end body, the wire cover has a first receding hole communicating the wire accommodation hole, and the piercing portion pierces the insulating layer of the cable wire in the wire accommodation hole through the first receding hole.

5. The piercing electrical connector as claimed in claim 4, wherein the wire end body has a second receding hole exposing the piercing portion and being close to the wire end contacting portion, the wire cover has a supporting pillar protruding into the second receding hole, and the supporting pillar is configured to be in contact with the wire end terminal to prevent deformation of the wire end terminal.

6. The piercing electrical connector as claimed in claim 4, wherein the wire end terminal further has a wire end fixing portion, the wire end contacting portion and the piercing portion respectively extend from two ends of the wire end fixing portion away from each other, the wire end fixing portion has an advancing stop position and a stopping hook, the wire end body has advancing stop stairs configured to block the advancing stop position to prevent the wire end fixing portion from being excessively inserted into the wire end body, and the stopping hook protrudes into the wire end body to prevent the wire end terminal from being removed out from the wire end body; a number of the piercing portion is two, the two piercing portions are configured to clamp the cable wire in the wire accommodation hole, and sides of the two piercing portions close to each other are configured to pierce the insulating layer of the cable wire in the wire accommodation hole.

7. The piercing electrical connector as claimed in claim 6, wherein a number of the wire end terminal is plural, the wire end body has a plugging blind groove, a corner of the plugging blind groove has a foolproof portion, the wire end contacting portion penetrates through a bottom wall of the plugging blind groove and protrudes into the plugging blind groove, the wire end contacting portions of the wire end terminals are parallel to one another and are disposed to be coplanar, the wire end contacting portion is formed by being bent and displaced from the wire end fixing portion, all the piercing portions of the wire end terminals form into two piercing rows, and in the two piercing rows, the piercing portions of different wire end terminals are disposed in a misaligned manner.

8. The piercing electrical connector as claimed in claim 1, further comprising a plate end connector plugged in and matched with the wire end connector, wherein the plate end connector has a plate end body, a plate end terminal disposed on the plate end body, and the plate end terminal is configured to be electrically connected to the wire end terminal; the plate end body has an extension arm and a concave hole disposed on the extension arm; the wire end body has a receding groove, the clasping arm has a pressing protrusion and a protruding clasp configured to protrude into the concave hole, and an external object is in contact with the pressing protrusion such that the clasping arm generates elastic deformation and enters the receding groove, and that the protruding clasp is removed from the concave hole.

9. The piercing electrical connector as claimed in claim 8, wherein the plate end terminal has a soldering connection foot and two elastic clamping arms connected to the soldering connection foot, the soldering connection foot is configured to be soldered to an external circuit board, the two elastic clamping arms are configured to clamp and electrically connect the wire end terminal, and a distance between two free ends of the two elastic clamping arms is less than a distance between ends of the two elastic clamping arms close to the soldering connection foot; the wire end body has a position limiting hole configured to accommodate the two elastic clamping arms, and the two elastic clamping arms respectively have two ends away from the soldering connection foot, avoidance recesses are provided at sides away from each other of the ends of the two elastic clamping arms away from the soldering connection foot.

10. The piercing electrical connector as claimed in claim 8, wherein the plate end connector further has a reinforcement soldering foot, the reinforcement soldering foot has two holding portions and two soldering connection portions, the two holding portions are disposed in parallel, the holding portions are installed inside the plate end body, the two soldering connection portions are disposed to be coplanar, the soldering connection portions are configured to be soldered to an external circuit board, the plate end body has a positioning pillar, the external circuit board has a positioning hole configured to accommodate the positioning pillar, and the positioning pillar is located between the two soldering connection portions.

* * * * *